(12) United States Patent
Floridia

(10) Patent No.: US 10,752,870 B2
(45) Date of Patent: Aug. 25, 2020

(54) APPARATUS FOR REGULATING AND CONTROLLING THE LEVEL OF FOOD LIQUID IN CLOSED CONTAINERS

(71) Applicant: PARSEC S.R.L., Florence (IT)

(72) Inventor: Giuseppe Floridia, Florence (IT)

(73) Assignee: PARSEC S.R.L., Florence (IT)

( * ) Notice: Subject to any disclaimer, the term of this patent is extended or adjusted under 35 U.S.C. 154(b) by 312 days.

(21) Appl. No.: 15/741,686

(22) PCT Filed: Jul. 11, 2016

(86) PCT No.: PCT/IB2016/054141
§ 371 (c)(1),
(2) Date: Jan. 3, 2018

(87) PCT Pub. No.: WO2017/006301
PCT Pub. Date: Jan. 12, 2017

(65) Prior Publication Data
US 2018/0187135 A1    Jul. 5, 2018

(30) Foreign Application Priority Data

Jul. 9, 2015   (IT) .................. 102015000032672

(51) Int. Cl.
*C12G 1/02*   (2006.01)
*C12C 13/10*   (2006.01)
(Continued)

(52) U.S. Cl.
CPC ............ *C12G 1/02* (2013.01); *C12C 13/10* (2013.01); *C12G 1/0216* (2013.01); *G05D 9/02* (2013.01); *C12L 9/00* (2013.01)

(58) Field of Classification Search
CPC .. C12C 13/10; C12L 9/00; G05D 9/02; C12G 1/0216; C12G 1/02
(Continued)

(56) References Cited

U.S. PATENT DOCUMENTS

| 2,649,771 A | * | 8/1953 | Parks | ........................ G05D 9/02 |
| | | | | 137/413 |
| 2,650,606 A | * | 9/1953 | Amidon | .................... G05D 9/02 |
| | | | | 137/211.5 |

(Continued)

FOREIGN PATENT DOCUMENTS

| DE | 27 37 809 A1 | 3/1978 |
| DE | 35 11 506 A1 | 10/1986 |

(Continued)

OTHER PUBLICATIONS

International Search Report and Written Opinion of the International Searching Authority for corresponding International Patent Application No. PCT/IB2016/054141 dated Nov. 2016, 9 pages.

*Primary Examiner* — Jermie E Cozart
(74) *Attorney, Agent, or Firm* — Merchant & Gould P.C.

(57) ABSTRACT

An automatic apparatus for regulating and controlling the level of a liquid (1) in a tank (2) includes a liquid level detector (8). A vessel (3) associated with the tank (2) has a predetermined volume and is equipped with an upper closure (6) and with an open bottom (5) in communication with the interior of the tank (2) at a height below the level of the liquid (1). The automatic apparatus increases/decreases a liquid-free portion of the volume inside the vessel (3) and consequently transfers part of the liquid to/from the tank (2) through the bottom (5) in response to changes in the liquid level inside the tank (2) as detected by the liquid level detector (8).

12 Claims, 8 Drawing Sheets

(51) Int. Cl.
   *G05D 9/02* (2006.01)
   *C12L 9/00* (2006.01)
   *C12G 1/032* (2006.01)
(58) Field of Classification Search
   USPC .......................................... 99/276, 277, 278
   See application file for complete search history.

(56) References Cited

U.S. PATENT DOCUMENTS 3,507,208 A     4/1970   Patchen
6,631,732 B1 * 10/2003   Koster ................. C12G 1/0216
                                                                           137/571

FOREIGN PATENT DOCUMENTS

| | | |
|---|---|---|
| EP | 0 959 127 A1 | 11/1999 |
| EP | 1 314 778 A1 | 5/2003 |
| EP | 1 964 914 A1 | 9/2008 |
| EP | 2 060 623 A1 | 5/2009 |
| FR | 2 587 813 A1 | 3/1987 |
| WO | 2010/105675 A1 | 9/2010 |
| WO | 2011/064294 A1 | 6/2011 |
| WO | 2011/148227 A1 | 12/2011 |

* cited by examiner

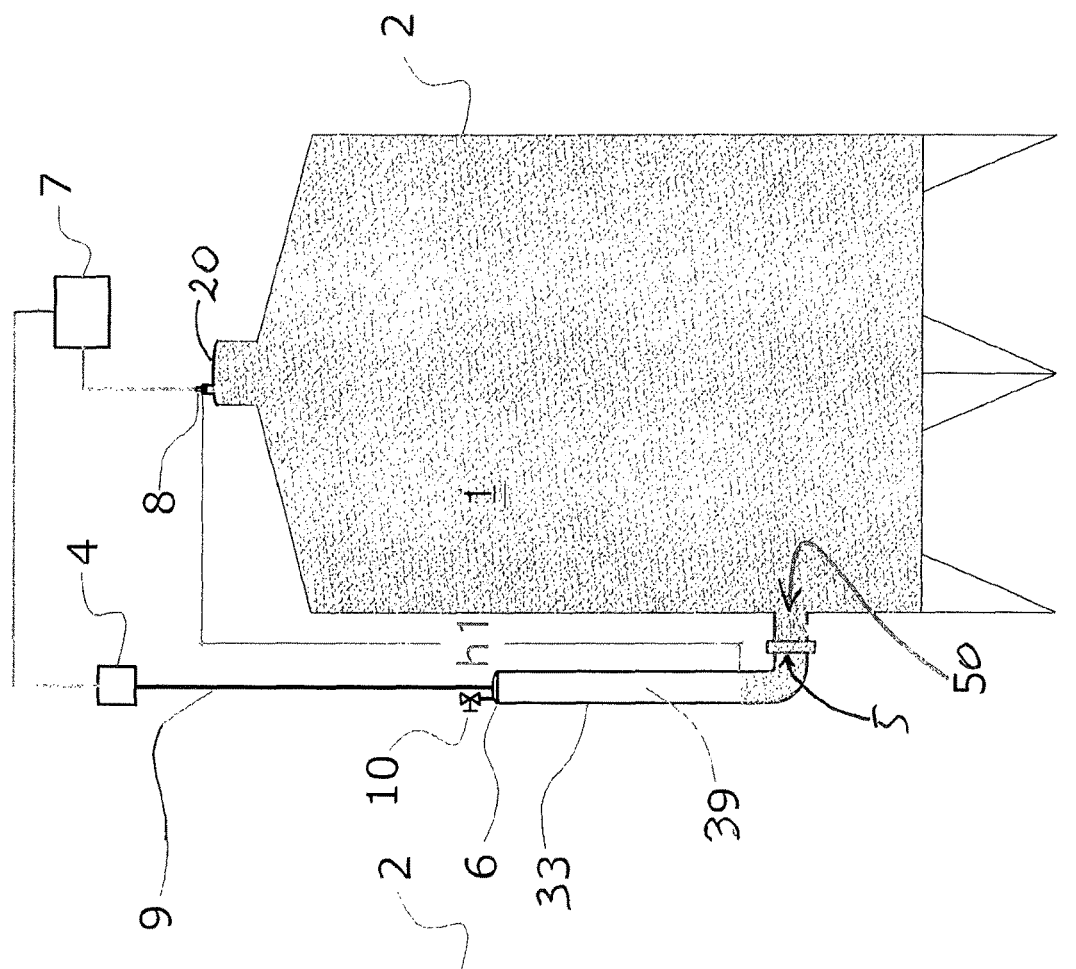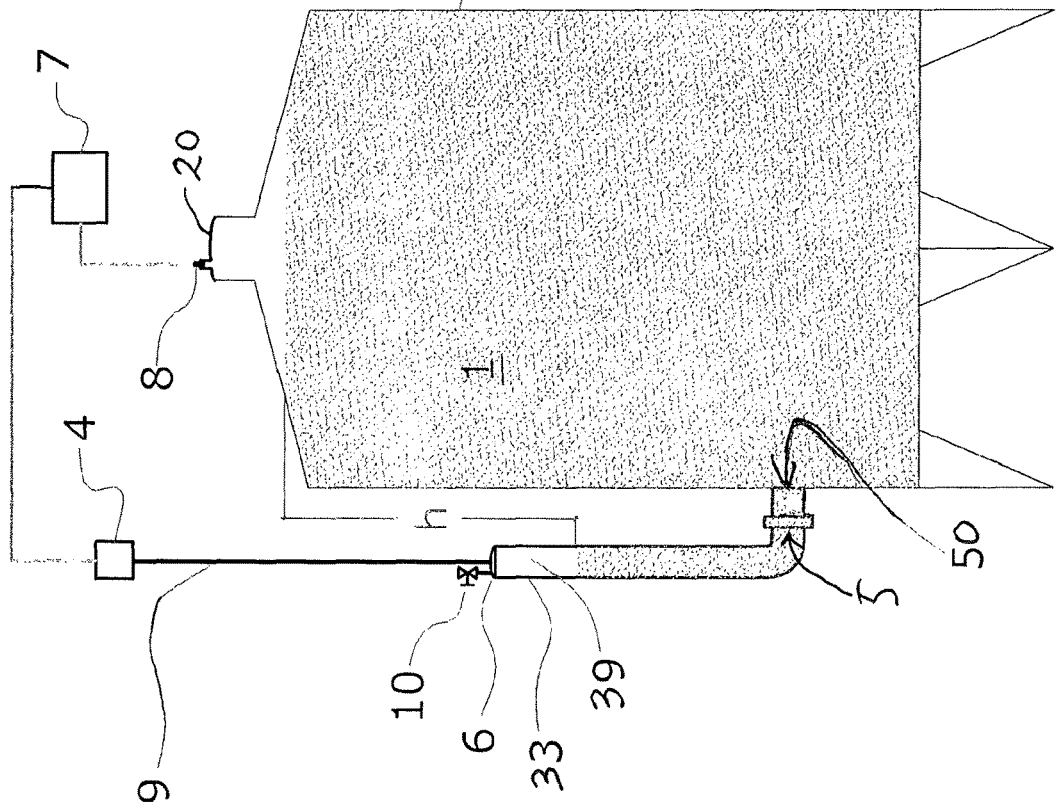
FIG. 5

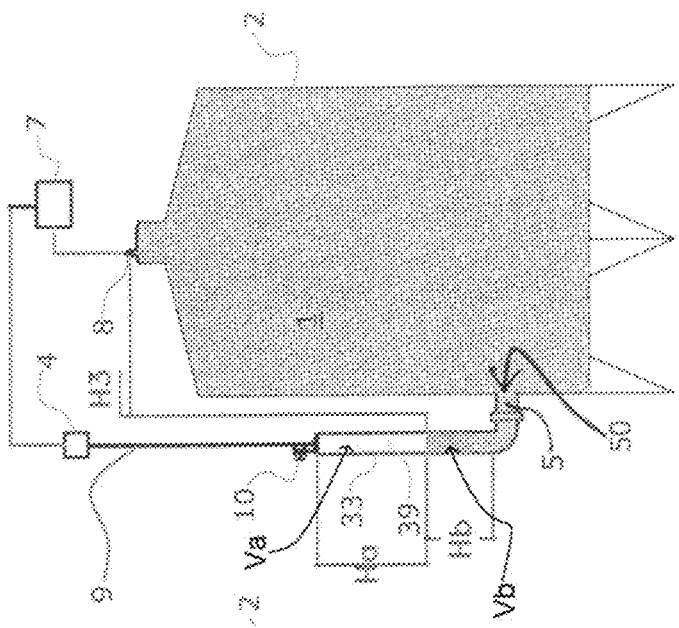
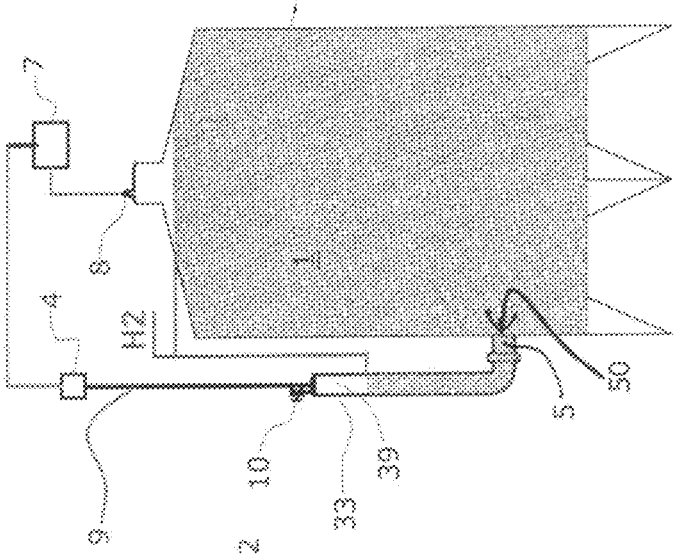
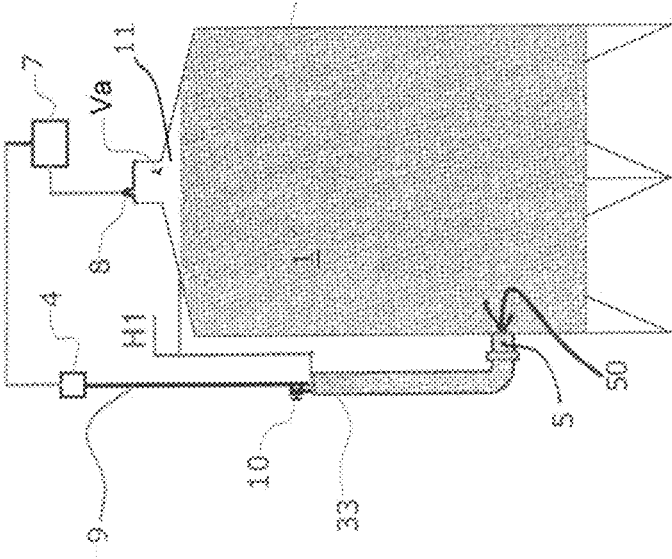

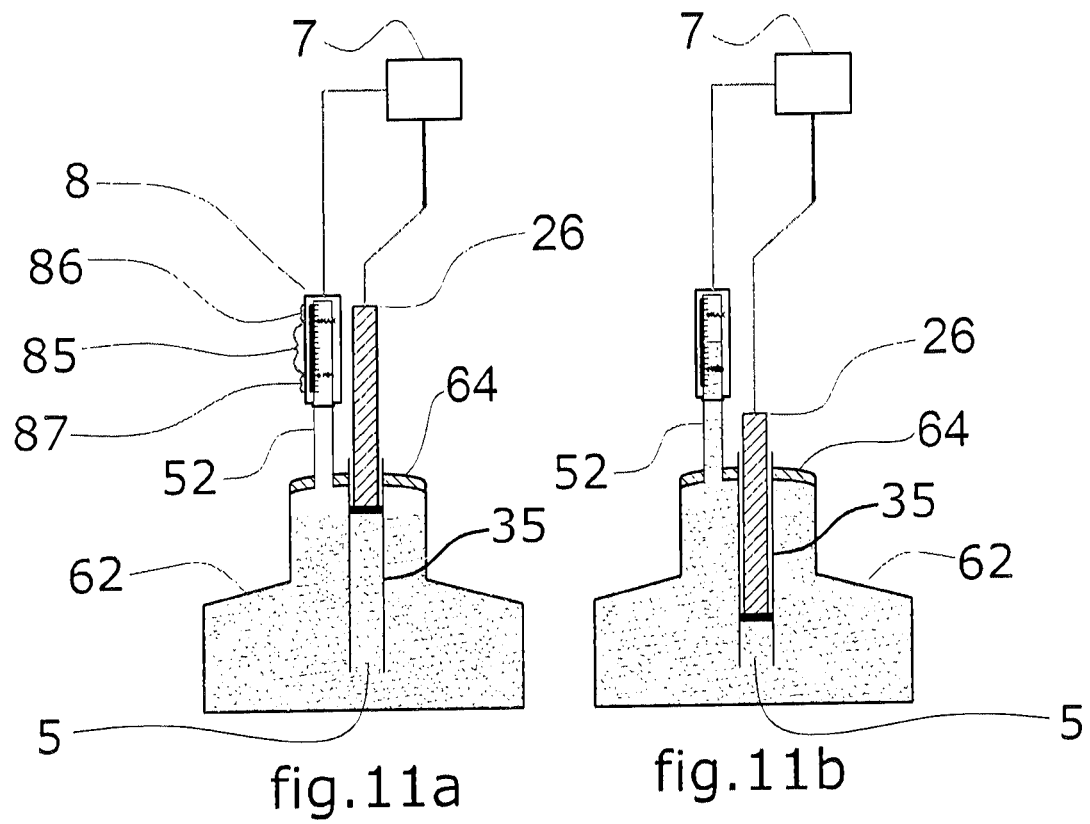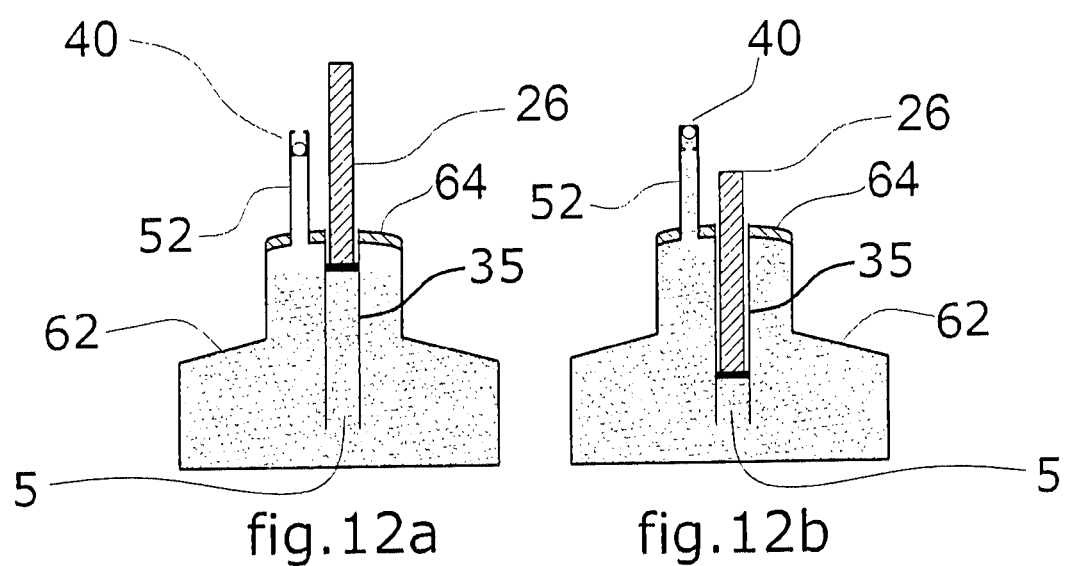

APPARATUS FOR REGULATING AND CONTROLLING THE LEVEL OF FOOD LIQUID IN CLOSED CONTAINERS

This application is a National Stage Application of PCT/IB2016/054141, filed 11 Jul. 2016, which claims benefit of Ser. No. 10/201,5000032672, filed 9 Jul. 2015 in Italy and which applications are incorporated herein by reference. To the extent appropriate, a claim of priority is made to each of the above disclosed applications.

TECHNICAL FIELD

The present invention relates to an apparatus for regulating and controlling the level of a food liquid in a closed container.

PRIOR ART

The level of a liquid in a closed container, e.g. a tank, is known to be subject to changes caused by the changing amount of liquid due to withdrawals or, if the container is not perfectly tight, due to natural evaporation.

Furthermore, the liquid level may change as a result of chemico-physical changes in the liquid and the container and particularly of temperature-dependent expansion of liquid.

Level changes may lead to a variety of drawbacks.

For example, an exceeding level may cause liquid leakages, leading to wastes and environmental pollution.

Furthermore, when hermetically sealed containers are used, pressure may dangerously increase in the container, leading to a risk of failure or breakdown. Conversely, a reduced level may lead to undesired ingress of air into the tank, or, with hermetically sealed containers, a negative pressure may be generated therein, which might affect the integrity of the tank.

Particularly, with food liquids subject to oxidation, such as wine, most containers and tanks are so conformed that a wide contact surface exists between the liquid and any air that has entered due to the reduction of liquid level. This leads to serious degeneration and chemical and microbiological changes, affecting the quality level of the liquid product.

One attempt to obviate these problems, especially in oak barrels used for wine making consists in topping up liquid to fill any level reduction.

Such topping up is generally performed manually to ensure that the procedure is carried out properly, particularly using the same liquid that is held in the container, or in any case a liquid suitable for that particular container (e.g. for wine, the same wine should be used, whereby one container might have to be sacrificed to distribute its contents among all the other containers).

Nevertheless, the topping technique is performed periodically and not continuously and immediately, whereby it cannot wholly prevent, but only reduce the aforementioned chemical and microbiological alterations occurring when the food product contacts air.

Gas sweeping is another technique that is used in the food industry. This technique consists in saturating the upper portion of the tank with an inert gas, thereby avoiding liquid-air contact, and can be automated to a certain extent, even though it has the drawback of requiring specially designed tanks. Furthermore, the gases suitable for such treatment are nitrogen ($N_2$), carbon dioxide ($CO_2$) and argon (Ar), the last two being "heavy" gases and ensuring adequate saturation of the entire surface, but having the drawback of having a high cost and, particularly in the case of $CO_2$, of easily dissolving in the liquid.

Nitrogen is most often used, due to economic reasons, but this gas cannot wholly saturate the surface, as its specific weight is similar to that of air.

Furthermore, this technique is not useful to prevent liquid leakage resulting from liquid volume increase.

Variable-volume containers have been also developed, which have a floating lid and a gasket ensuring the sealing effect. This arrangement is particularly used when tanks are designed to be slowly emptied (e.g. in case of partial emptying).

A further technique involves the use of variable-volume members, such as balloons or other elastic bodies, which are inflated and deflated to maintain a constant liquid level.

Examples of arrangements involving the presence of variable-volume bodies in the tank are disclosed in DE3511506, FR2587813, WO2011064294, IT1390943 and IT1415474.

Nevertheless, the apparatus disclosed in these patent publications have a complex structure, are prone to failure due to repeated inflation and deflation cycles, and also have non-negligible dimensions, which considerably reduce the actual capacity of the tank and hinder cleaning and sanitization once the tank has been emptied.

DISCLOSURE OF THE INVENTION

The object of the present invention is to provide an apparatus for automated regulation and control of the level of a food liquid in a tank or the like, that is accurate, effective and non-invasive, that can be easily installed and removed and involves no risk of failure or material-compatibility limits.

This object is fulfilled by an apparatus as defined in the main claim and comprising:
  a vessel having a predetermined volume, associated with the liquid-containing tank and provided with an upper closure and with an open bottom in communication with the interior of the tank at a height below the liquid level, and
  means for increasing/decreasing a liquid-free portion of the volume inside the vessel and, as a result, for transferring part of the liquid to/from the tank through the bottom in response to liquid level changes detected in the tank.

Particularly, the increase/decrease of the liquid-free volume is obtained by applying a positive/negative pressure to the meniscus of the liquid contained n the vessel.

The dependent claims define the features of certain advantageous embodiments of the invention.

The features and advantages of the present invention will appear from the following description of a few embodiments, which are proposed by way of example and without limitation in the annexed drawings.

BRIEF DESCRIPTION OF THE DRAWINGS

In the drawings:

FIGS. 4, 5 and 6 schematically show sectional views of the operation of a fourth embodiment of the apparatus;

FIGS. 11 and 12 schematically show two variant embodiments of the apparatus, suitable for application to small tanks.

EMBODIMENTS OF THE INVENTION

Figure 1:
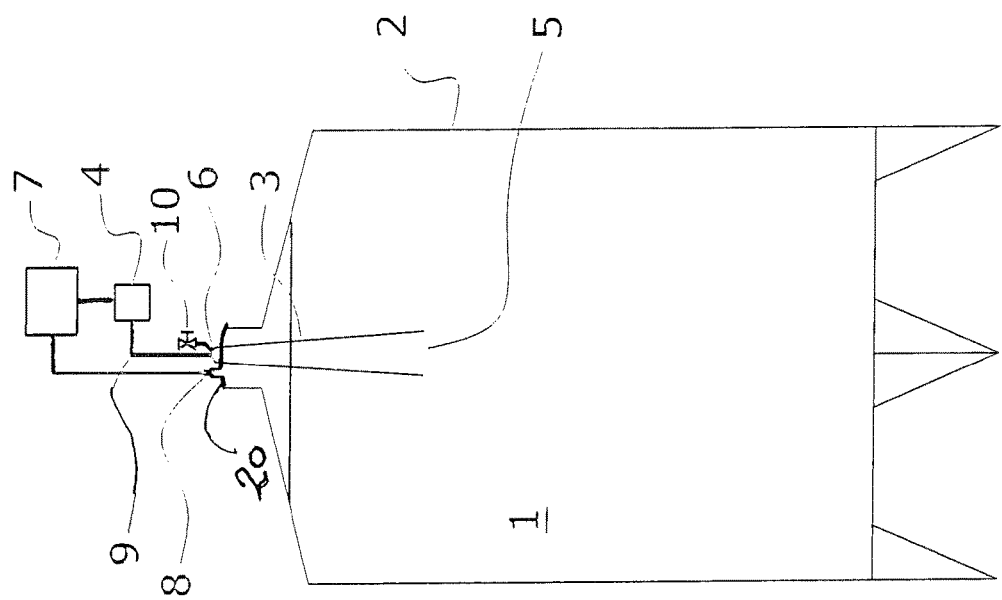
FIGS. 1, 2, 3 schematically show sectional views of three embodiments of an apparatus according to the invention.
Figure 2:
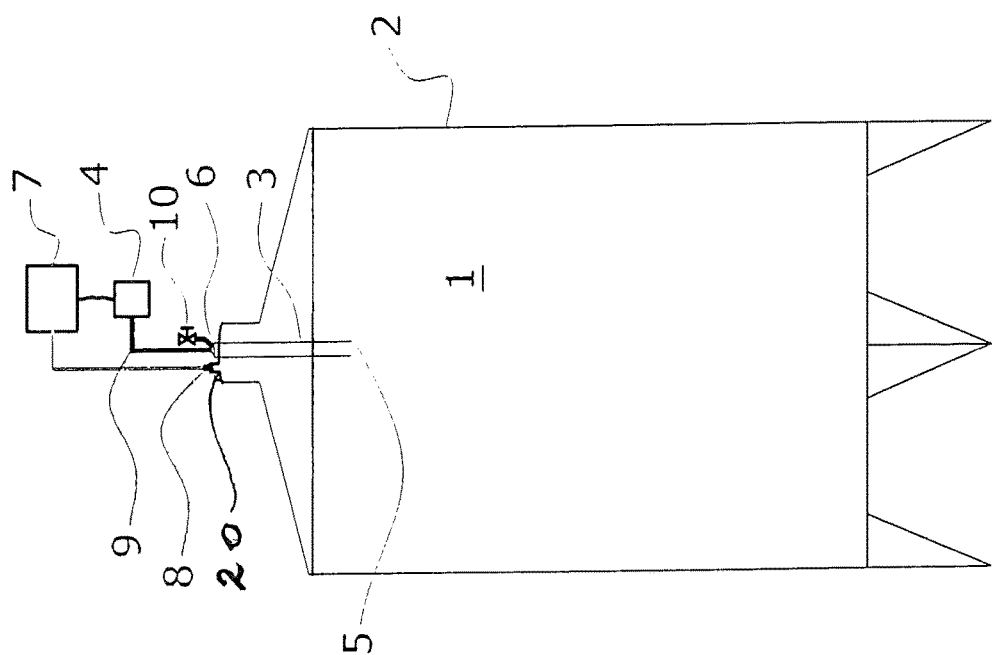
Figure 3:
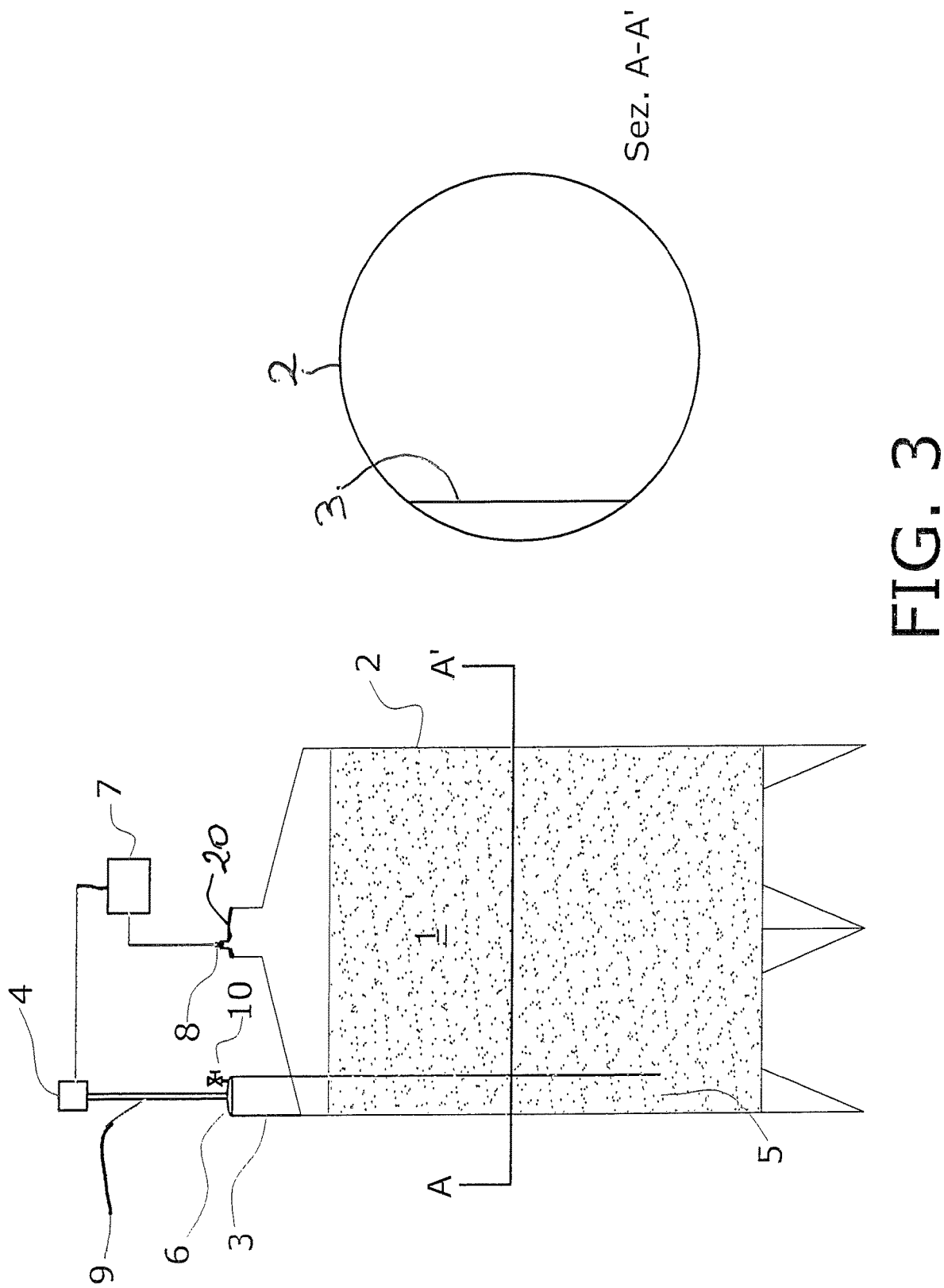

FIGS. 1, 2 and 3 show three variants of a preferred embodiment of an inventive apparatus for regulating and controlling the level of liquid 1 in a tank 2 having a cover 20 at its top.

This apparatus is and comprises:
 a vessel 3 rigidly joined to said tank and having a predetermined volume, with an open bottom 5, located below the liquid level and communicating with the interior of the tank 2 and with the closed top portion 6;
 pressure control means 4 for controlling the pressure in the vessel 3 by introducing/extracting an inert gas into/from the vessel 3, through a conduit 9;
 detection means 8 for detecting the level of liquid in the tank;
 control means 7 associated with the control means 4 and with the detection means 8.

Advantageously, the vessel 3 may be equipped with an air-relief valve 10, mounted to the closed portion external to the tank to facilitate release of air therefrom upon first installation.

The vessel 3 may be arranged to be rigidly joined to the cover 20 of the tank 2 (as shown in FIGS. 1 and 2), for easy removal and cleaning thereof, or may be formed from portions of the tank 2 (see FIG. 3).

The vessel 3 may be formed of any shape, e.g. of cylindrical (see FIG. 1), conical (see FIG. 2), parallelepiped shapes etc., and may be oriented and positioned in any point of the tank, provided that the open bottom 5 is maintained below the level of liquid 1 and communicates therewith. Furthermore, the vessel 3 may have such a size and capacity as to allow application thereof to tanks and containers of any type and capacity.

Figure 4:
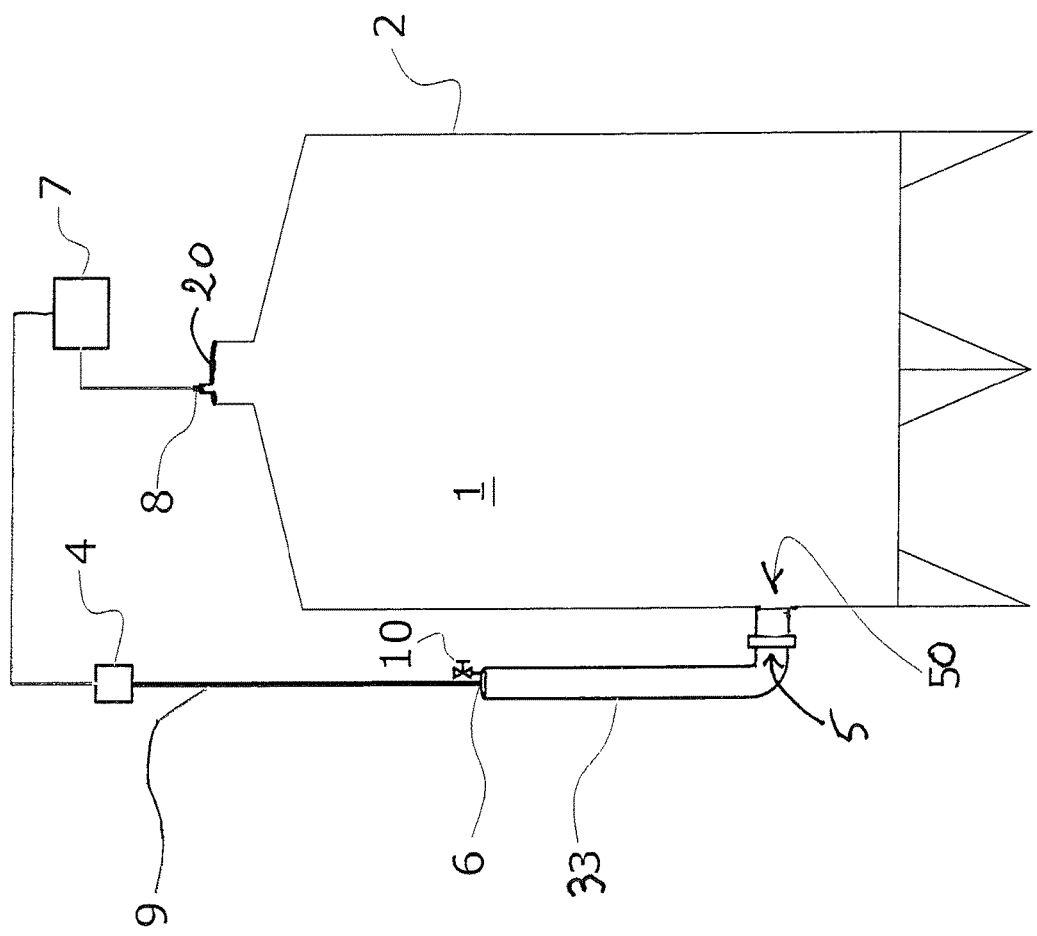

FIGS. 4, 5 and 6 show a variant embodiment of the apparatus, in which a vessel 33 is mounted outside the tank and is connected thereto via an existing or specially-formed passageway 50, located below the level of the liquid 1.

For this purpose, the vessel 33 may be converted from any existing pipe on the tank, such as the pipe that provides communication between the lower portion and the upper portion of the tank, e.g. the pipe that allows pumping of wine over the cap, as used both in must fermentation tanks and in wine storage tanks.

As shown in FIG. 5, since the vessel 33 is externally closed, the pressure generated by the inert gas blown therein creates a volume filled with inert gas, and hence free of liquid, in the upper portion 39.

By injecting or extracting inert gas into/from the vessel 33, using the control means 4 and the conduit 9, the pressure in the liquid-free portion 39 may be increased or decreased, and the volume may be accordingly increased or decreased.

Since the vessel 33 is rigidly joined to the tank 2 and communicates with its interior through its open bottom 5 and the passageway 50 located below the level of liquid 1 in the tank, any change in the liquid-free volume 39 will lead to a change in the liquid level in the tank 2 and the pressure in the liquid-free upper area of the vessel 33 will be equal to the buoyancy, corresponding to the difference in height (h; hl) between the two liquid levels in the tank 2 and the vessel 33.

The vessel 33 substantially acts as a surge chamber, and the volume of the vessel reflects the maximum compensation for the level of the liquid 1 in the tank 2. Particularly, the liquid-free part under the pressure of inert gas 39 corresponds to the compensation volume if the level of liquid 1 in said tank 2 increases due to an increase of volume of liquid 1 caused by thermal expansion or by introduction of liquid or solids into the tank from outside.

FIG. 6 shows the steps of operation of the system.

At the start (see FIG. 6a) the vessel 33 is filled with liquid and the control means 4 sense a pressure of $\rho g H1$ ($\rho$=liquid density; g=gravity acceleration; H1 liquid level height).

In this state, the empty tank area 11, i.e. filled with air and free of liquid, has a volume Va.

Upon introduction of inert pressure into the vessel 33, with pressure therein increasing to a value $\mu g H2$ a volume 39 filled with inert gas is created in the upper portion of the vessel (see FIG. 6b). The amount of liquid that is drained from the vessel 33 through the bottom 5 in communication with the tank 2 increases the amount of liquid in the tank and raises its level. Namely, the amount of liquid in the tank 2 increases by a volume that is equal to the volume of the vessel 33 that has been emptied of liquid and filled with inert gas.

Further introduction of inert gas will entirely fill the tank 2 (see FIG. 6c).

Now, an inert gas-filled volume Va having a height Ha and a liquid-filled volume Vb having a height Hb are created in the vessel 33.

The two volumes Va and Vb reflect the maximum liquid amount changing limit. Particularly, the device can maintain a constant liquid level in the tank 2 by compensating for liquid expansion to a volume Va or by compensating for liquid volume reduction to a Volume Vb.

Therefore, the total volume Va+Vb of the vessel 33 may be advantageously selected as needed.

The examples of FIGS. 1 to 3 have the same operation.

The last described embodiment of the apparatus, with the vessel 33 mounted outside the tank 2, has the advantage that it can be used, through positive/negative pressure cycles in the vessel 33, to generate shock waves in the tank 2 and disintegrate the cap of marc during must fermentation.

Figure 7:
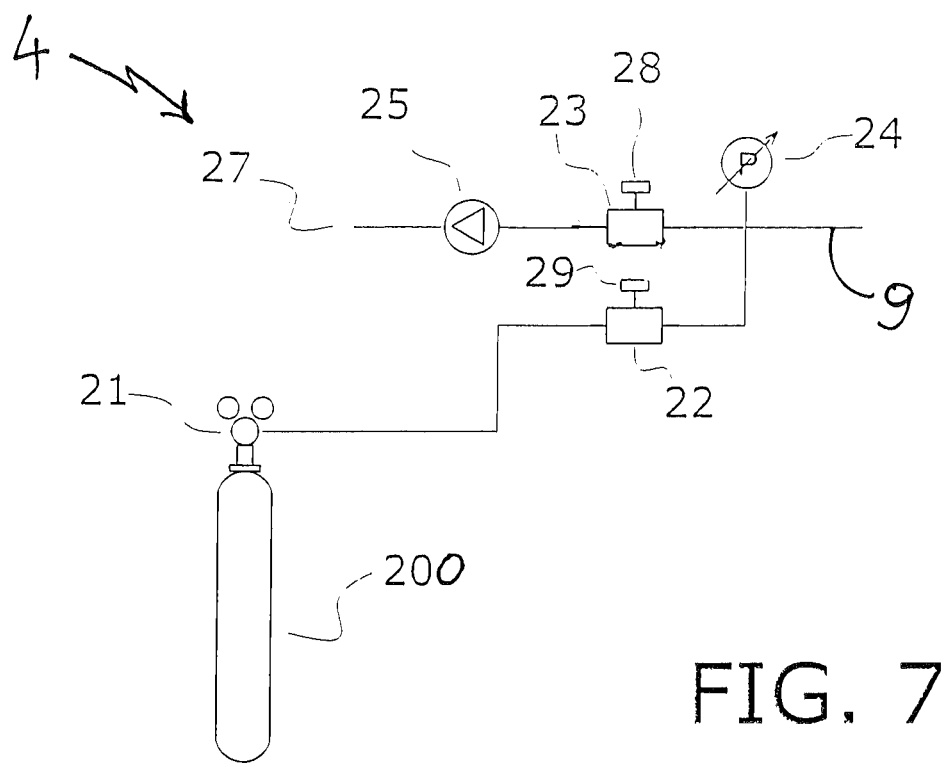
FIG. 7 shows a first possible embodiment of the control means in the apparatus.

FIG. 7 shows a possible embodiment of the control means 4 for controlling pressure in the vessel 3, 33 by introducing/removing an inert gas, which means comprise:
an inert gas bottle 200, a pressure reducer 21, injection flow regulating means 22, extraction flow regulating means 23; an extraction actuator 28; an injection actuator 29; pressure measurement means 25, gas extraction means 25; an inlet/outlet conduit 9 communicating with the vessel; an outlet conduit 27 communicating with the atmosphere.

If the vessel 33 is installed with its upper portion below the top level of the liquid in the tank 2, the gas extraction means 25 may be avoided, as pressure in the upper portion of the vessel 33 will be higher than atmospheric pressure.

Figure 8:
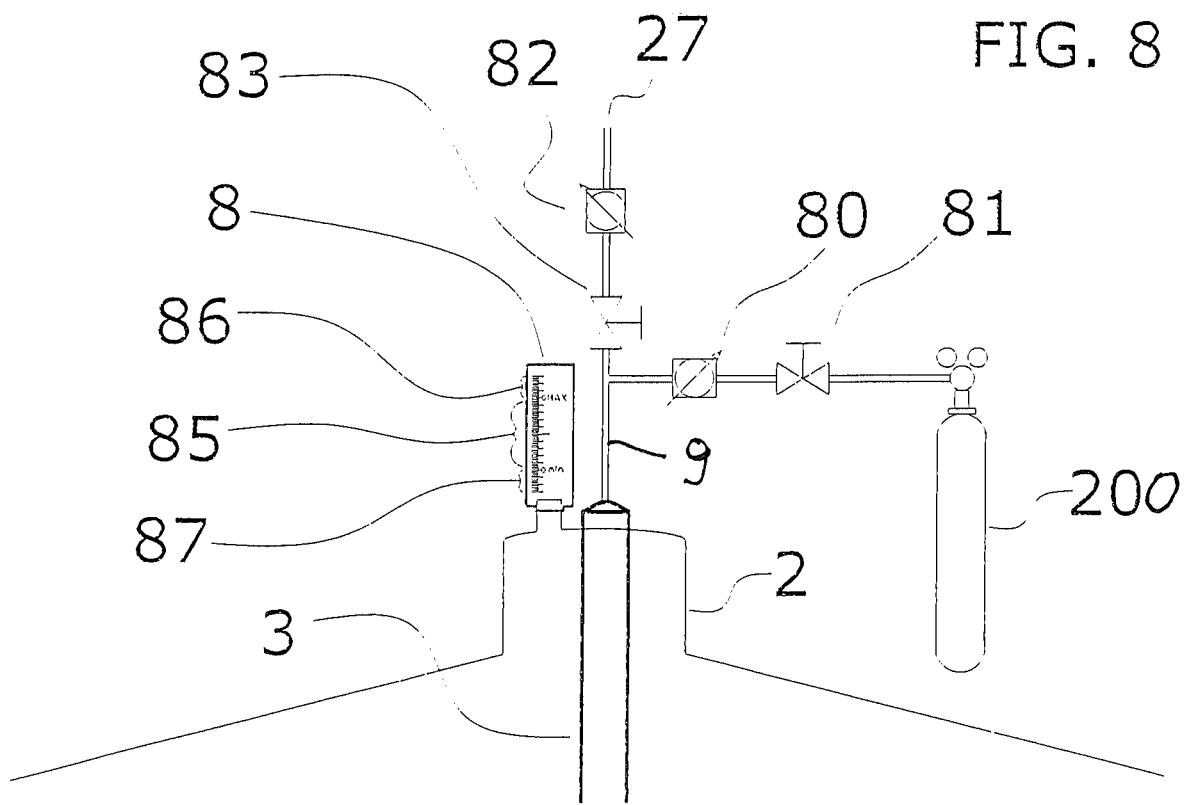
FIG. 8 shows a second possible embodiment of the control means provided in combination with liquid level-detection means.

The inert gas bottle 200 may be replaced by a nitrogen generator with a storage reservoir or by appropriate connections to existing compressed technical gas circuits. In a simplified embodiment, as shown in FIG. 8, the aforementioned injection/extraction flow regulating means 22, 23 and their respective actuators 28, 29 may be replaced by normal manual valves 81, 83 in combination with preset flow regulators 80, 82 and a liquid level detector 8 for detecting the level of liquid in the tank 2, e.g. a glass tube that allows simple visual level assessment against the minimum and maximum filling thresholds for the tank 2.

Here, the tank 2 shall be preset with an appropriate level decrease/increase limit corresponding to the min-MAX limit 85, as well as with appropriate safety limits 86, 87 above the min-MAX limit, to accommodate a manual action by the operator.

For this purpose, the apparatus may be equipped with optical/acoustic devices to urge for a manual action by the operator.

Preferably, the liquid level detection means 8 comprise detectors selected from the group comprising float gages, magnetic float gages, ultrasound detectors, mechanical detectors with microswitches, capacitive detectors, ohmic detectors, optical detectors.

Advantageously, automated microprocessor control means 8 may be provided, connected to the control means 8 for controlling the level of liquid in the tank 2 and to the control means 4 for controlling the pressure in the tank, which microprocessor means act upon the extraction actuators 28 and the injection actuators 29 to adjust the level of liquid in the tank.

Advantageously, the accuracy of pressure measurements, which are not affected by elastic partitions or variable-volume tanks, allows the level detection means to be replaced by float closures which hermetically seal the tank as soon as the fill level is reached.

Once the tank has been closed, the control system 7 will act upon the extraction actuators 29 and injection actuators 29 to maintain a constant pressure, by compensating for any increase in the liquid amount in the tank 2 by acting on gas removal 28 and thereby reducing the volume Va.

Conversely, any decrease in the liquid amount in the tank 2 will be compensated for by acting on the introduction of inert gas, to thereby increase the volume Va.

Figure 9:
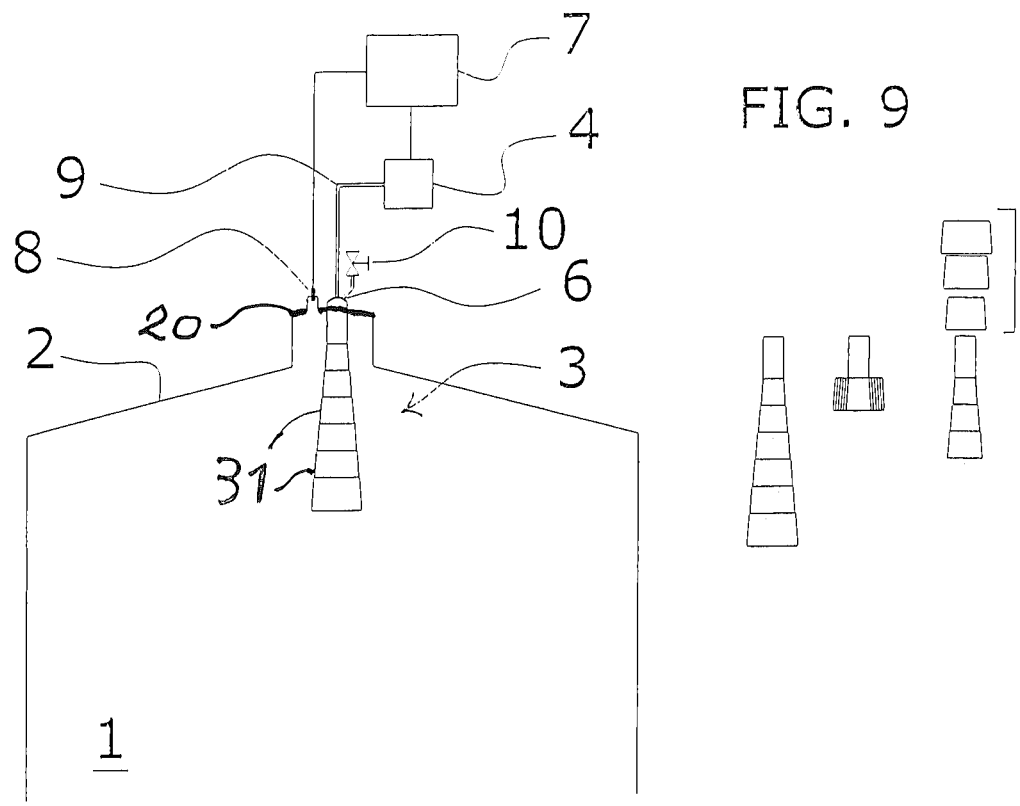
FIGS. 9 and 10 schematically show possible embodiments of the vessel in the apparatus.

As shown by way of example in FIG. 9, the vessel 3 may be advantageously formed with a telescopic construction composed of frusto-conical elements 31 or frusto-pyramidal elements, for the volume to be adapted to needs associated with the size of the tank 2.

Figure 10:
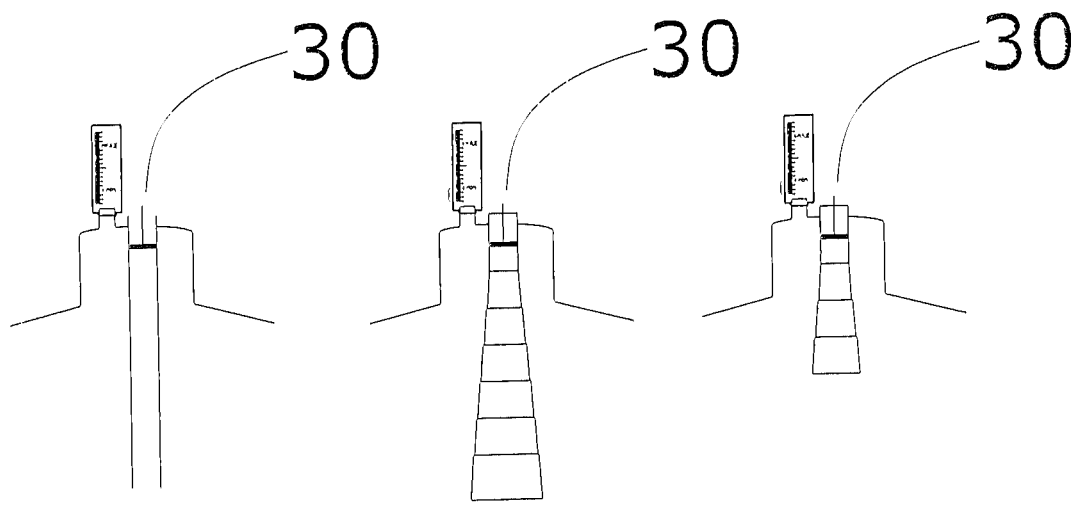

Furthermore, the upper portion of the vessel 3 may be formed as a cylinder combined with a tightly moving piston 30 to simplify the initial assembly and calibration operations (see FIG. 10).

FIGS. 11 and 12 show two particularly advantageous variant embodiments of the invention for automatic continuous filling of tanks having a relatively small volume, such as oak barrels 62.

In both cases, a cylindrical vessel 35 is associated with the tank 62, which is open both at the bottom end situated below the level of liquid in the tank 62 and at at the top end. This allows the use of a fluid-tight piston 26 for applying a pressure to the meniscus of the liquid in the vessel 35 and accordingly change the liquid level in a filling chamber 52 located at the top of the tank 62 and equipped with a level detector 8, e.g. similar to that described with reference to FIG. 8.

Both the vessel 35 and the filling chamber 52 are preferably rigidly mounted to a removable closure 64 of the tank 62.

The piston may be made of any material that ensures compatibility with the liquid and may be driven by a control system and a mechanical actuator (e.g. a motorized worm) or a pneumatic actuator (e.g. nitrogen or even compressed air, as it does not contact the liquid).

FIG. 12 shows the arrangement in which the piston is simply driven downwards by its own weight, which is appropriately calculated to overcome frictions and the difference in height from the liquid that reaches the fill level. Here, the tank 62 may be advantageously equipped with mechanical means that detect the presence of liquid or simply a float valve 40 which closes the tank when the liquid level has entirely filled the filling chamber 52.

In this case, any expansion of the liquid will push the piston upwards or conversely, any liquid reduction due to evaporation or temperature will move it downwards while maintaining the tank in the filled state.

The invention claimed is:

1. An apparatus for regulating and controlling a level of a liquid in a tank equipped with a closure, said apparatus comprising liquid level detection means, the apparatus comprising:
   a vessel associated with the tank, having a predetermined volume and equipped with an upper closure and with an open bottom in communication with the interior of the tank at a height below the level of the liquid;
   means for increasing/decreasing a liquid-free portion of a volume inside the vessel and for transferring part of the liquid to/from the tank through the bottom in response to changes in the liquid level inside the tank as detected by the detection means.

2. The apparatus of claim 1, wherein said means for increasing/decreasing a liquid-free portion of the volume inside the vessel comprise means for applying a positive/negative pressure to a meniscus of the liquid contained in a rest of the vessel.

3. The apparatus of claim 1, wherein said means for increasing/decreasing a liquid-free portion of the volume inside the vessel comprise means for introducing/extracting an inert gas into/from said vessel.

4. The apparatus of claim 3, wherein said vessel is located at least partly inside the tank.

5. The apparatus of claim 4, wherein said vessel is associated with the closure of the tank and is located inside the tank.

6. The apparatus of claim 5, wherein said vessel has a telescopic construction with frusto-conical elements or frusto-pyramidal elements, allowing adaptation of the volume.

7. The apparatus of claim 3, wherein said vessel is located outside the tank and is connected to the tank through the bottom and a passageway formed in the tank wall below the level of the liquid.

8. The apparatus of claim 1, wherein said liquid level detection means comprise a filling chamber located at a top of the tank and wherein said upper closure of the vessel and said means for increasing/decreasing a liquid-free portion of the volume inside the vessel comprise a fluid-tight piston and respective drive means.

9. The apparatus of claim 8, wherein said vessel and said filling chamber are supported by a removable closure of the tank.

10. The apparatus of claim 8, wherein said drive means for the piston comprise weight of the piston and wherein mechanical means are provided for closing the tank when the liquid has entirely filled the filling chamber.

11. The apparatus of claim 1, comprising microprocessor means connected to said control means for controlling the level of liquid in the tank and to said means for increasing/decreasing a liquid-free portion of the volume inside the vessel.

12. A method of using an apparatus for regulating and controlling a level of a liquid in a tank equipped with a closure, said apparatus comprising liquid level detection means, a vessel associated with the tank, having a predetermined volume and equipped with an upper closure and with an open bottom in communication with the interior of the tank at a height below the level of the liquid; means for increasing/decreasing a liquid-free portion of a volume inside the vessel and for transferring part of the liquid to/from the tank through the bottom in response to changes in the liquid level inside the tank as detected by the detection means;

wherein said means for increasing/decreasing a liquid-free portion of the volume inside the vessel comprise means for introducing/extracting an inert gas into/from said vessel; the method comprising: applying positive/negative pressure cycles in the vessel, to generate shock waves inside the tank that contains fermenting must and disintegrate a cap of marc.

* * * * *